June 10, 1969
R. R. TWELVES
3,449,397
PREPARATION OF DICHLOROPHENYL ISOCYANATE
Filed April 6, 1966
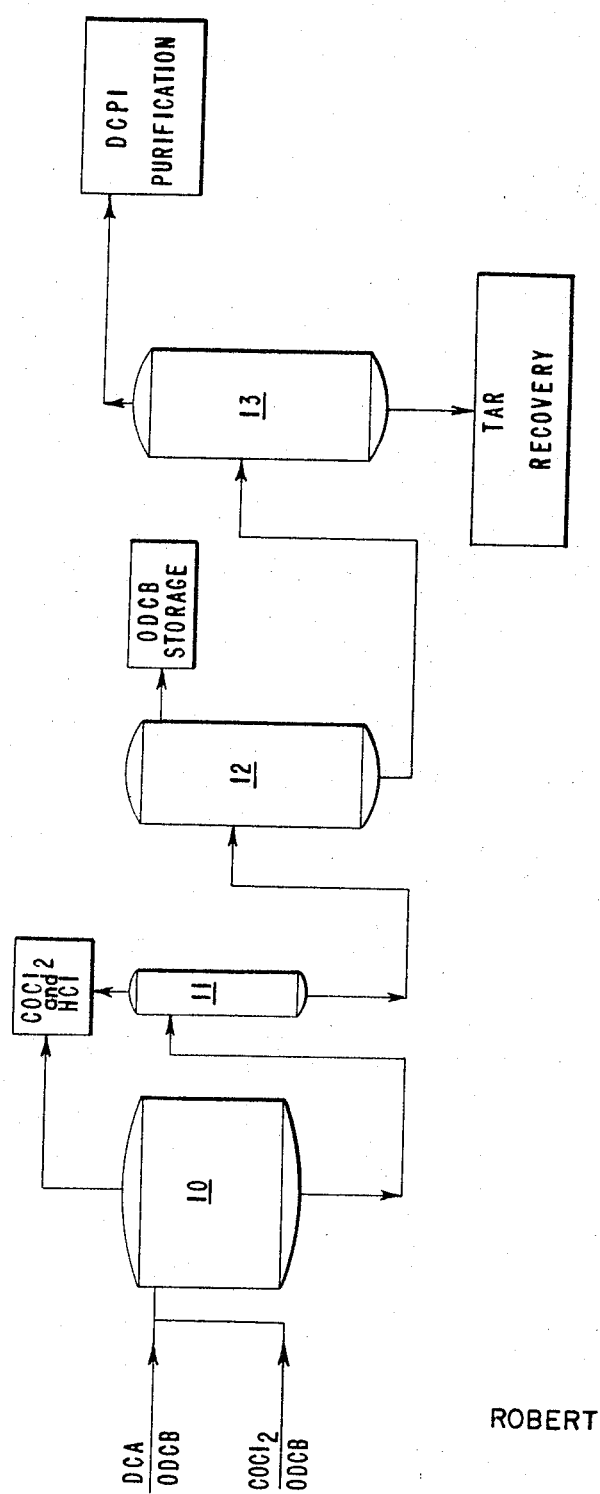
INVENTOR
ROBERT R. TWELVES
ATTORNEY

United States Patent Office 3,449,397
Patented June 10, 1969

3,449,397
PREPARATION OF DICHLOROPHENYL ISOCYANATE
Robert Ralph Twelves, Wilmington, Del., assignor to E. I. du Pont de Nemours and Company, Wilmington, Del., a corporation of Delaware
Filed Apr. 6, 1966, Ser. No. 540,742
Int. Cl. C07c *119/04;* C07d *87/22*
U.S. Cl. 260—453                                      3 Claims

ABSTRACT OF THE DISCLOSURE

In a process of manufacturing 3,4-dichlorophenyl isocyanate by reacting 3,4-dichloroaniline and phosgene, morpholine or morpholine carbamyl in an amount equivalent to 0.2 to 5% morpholine based on the weight of the 3,4-dichloroaniline is added to inhibit the formation of undesirable solids and to stabilize the tar that forms.

---

This invention relates to isocyanate production and more particularly to the production of 3,4-dichlorophenyl isocyanate.

The preparation of organic isocyanates by the phosgenation of amines is well known and a preferred process is described in Beck, U.S. Patent 2,822,373. When the isocyanate is produced in the phosgenation reaction mass, minor amounts of complex higher-boiling side-products are also formed which accumulate with some of the isocyanate as a distillation heel called "tar" when the solvent and most of the isocyanates are distilled. As described in Griffin et al., U.S. Patent 2,889,257, these tars can be processed so as to remove more isocyanate therefrom after ordinary distillation.

It is found, however, in the preparation of 3,4-dichlorophenyl isocyanate (DCPI) from 3,4-dichloroaniline (DCA) and phosgene (COCl$_2$) that the tar which accumulates may be quite unstable and that large amounts of solids can form therein that seriously restrict the further processing of the tars to recover the isocyanate therefrom.

It has quite unexpectedly been found in the preparation of dichorophenyl isocyanate that the tar stability can be greatly improved and the formation of undesired solids inhibited by the addition of small amounts of morpholine.

The term "tar stability" as used herein means a loss of available dichlorophenyl isocyanate initially present in the tar by undesired reaction of the isocyanate groups due to being held at temperatures of about 160° C. for extended periods. This may be determined in the laboratory by removing the dissolved gases, solvent and about 80 to 90% of the dichlorophenyl isocyanate from the phosgenation reactor effluent to produce a sample of about 60 weight percent dichlorophenyl isocyanate (based on titration of free —NCO groups). After holding this sample at 160° C. for 6 hours, a second titration is made; a total loss of more than about 2 percentage points (e.g., a drop to a solution of less than about 58 percent) in dichlorophenyl isocyanate concentration is regarded as a poor tar stability and is a measure of decrease in net yield experienced in production operation.

The term "solids" refers to the insoluble compounds (probably biurets) that can precipitate in the processing equipment which not only represent a loss in yield but also constitute a severe problem in processing.

If less than about 0.2 percent morpholine (based on the weight of DCA added) is employed any improvement observed is quite erratic; use of more than about 5 percent morpholine may have objectionable effects on the reaction and the product produced. An experiment employing 2 percent morpholine indicates very satisfactory results; however, it is preferred to employ from about 0.35 to 0.85 percent morpholine to achieve both satisfactory results and a low morpholine derivative content in the product. The reaction conditions are such that the morpholine can be converted in the phosgenator to morpholine carbamyl chloride. Accordingly, it is found that the same improvement can be realized by adding morpholine carbamyl chloride to the phosgenation reactor in amounts equivalent on a mole basis to the amounts of morpholine set forth above.

The invention will now be described in reference to the accompanying drawing of a schematic process flowsheet illustrating a specific embodiment thereof.

To employ the instant invention in the above-described process morpholine may be added to the dichloroaniline before introduction into reactor 10 in an amount, for example, of about 0.7 percent based on the weight of the dichloroaniline. An alternative is to prepare morpholine carbamyl chloride separately and introduce it to reactor 10 in amounts equivalent (on a mole basis) to that which would be present if morpholine had been added in the dichloroaniline stream.

The dichloroaniline (DCA) is introduced into the phosgenation reactor 10 as a 10 to 15 weight percent solution in o-dichlorobenzene (ODCB). Also introduced into reactor 10 is a stream of phosgene (COCl$_2$) in o-dichlorobenzene. The mole ratio of phosgene to dichloroaniline is about 4 to 1. The amounts of o-dichlorobenzene introduced should be such that there is a maximum of about 10 weight percent dichlorophenyl isocyanate in reactor 10. The off-gas from reactor 10 is a mixture of about 60 mole percent phosgene and 40 mole percent HCl. The temperature in reactor 10 is kept at about 158° to 165° C., perferably at least 160° C., and the hold time is about 45 minutes. The bottom stream is introduced into a degasser 11 where phosgene and HCl are removed at about 180°–190° C. The product stream is introduced into a solvent distillation assembly where the o-dichlorobenzene is removed at about 135 to 165 mm. Hg pressure and about 170°–180° C. The product stream is then conducted to the tar concentrator 13 where the relatively pure dichlorophenyl isocyanate is separated from the tar reaction product by distillation and sent for further purification steps. The tar concentrator is operated at about 20 to 50 mm. Hg pressure and 160° to 170° C. The holdup time can be up to 60 hours or more. The bottoms from tar concentrator 13 are sent to a tar recovery assembly which may be that described in Griffin, et al. U.S. Patent 2.889,257. Note, however, that the residue produced is fluid rather than solid.

The important advantage of the present invention is realized in the operation of the tar concentrator 13. Without the morpholine, the tar stability and the "solids" separation can be so bad that the material being processed therein becomes almost unmanageable with consequent losses in net yield. Utilizing the morpholine seems to eliminate this problem. When morpholine is used in production operation in conjunction with strong phosgenation conditions (i.e., 300 percent excess COCl$_2$ and 160° C. reaction temperature), net yields of more than 80 percent can be realized. If morpholine is not used and the phosgenation conditions are less strong (e.g., 150° C. and 100 percent excess COCl$_2$) net yields of less than 50 percent can result. Laboratory experimentation indicates that merely using strong phosgenation without morpholine can still result in poor yields due to solids separation and poor tar stability.

When the dichloroaniline to be employed as a starting material is morpholine-free, the amount added can be easily determined by weight or volume. However, if the dichloroaniline has been produced in accordance with a process as described in Kosak, U.S. Patent 3,145,231, it may already have morpholine or its hydrochloride in it. The amount present can be determined by potentiometric titration. Briefly, about 25 g. of dichloroaniline is dissolved in 100 ml. anhydrous isopropyl alcohol. About 25 ml. of 1% aqueous NaCl is mixed in and the mixture is made strongly alkaline with an aqueous 33% NaOH (carbonate-free) solution. Upon a back titration with a 0.1 N HCl solution, two inflection points will be sensed by the potentiometer (a Sargent Model D Recording Titrator). The quantity of HCl used between the two inflection points is equivalent to the morpholine present. If the amount present is determined to be sufficient for use in accordance with this invention it can, of course, merely be employed in the dichloroaniline feed stream to the phosgenator. However, it may be desirable or necessary to add additional morpholine thereto.

What is claimed is:

1. In the process of preparing 3,4-dichlorophenyl isocyanate by reacting 3,4-dichloroaniline and phosgene, present in about 300 mole percent excess at about 158°–165° C., the improvement which consists of the addition of morpholine or morpholine carbamyl chloride in amounts equivalent to 0.2 to 5 percent morpholine based on the weight of 3,4-dichloroaniline to provide tar stability and the inhibition of the formation of undesired solids.

2. The process as described in claim 1 wherein said amounts range from about 0.35 to 0.85 percent.

3. In the process for preparing 3,4-dichlorophenyl isocyanate which comprises reacting 3,4-dichloroaniline with phosgene, present in about 300 mole percent excess at about 158°–165° C., said separating part of the 3,4-dichlorophenyl isocyanate from the tar reaction product by distillation, the improvement in tar stability and inhibition of formation of undesired solids during said distillation which consists in the addition to said 3,4-dichloroaniline from about 0.35 to 0.85 weight percent morpholine.

References Cited

UNITED STATES PATENTS

| | | | |
|---|---|---|---|
| 2,362,648 | 11/1944 | Lichty et al. | 260—453 |
| 2,795,597 | 6/1957 | Smutz | 260—453 |
| 3,145,231 | 8/1964 | Kosak | 260—580 |

FOREIGN PATENTS 1,756,565  8/1965  Japan.

CHARLES B. PARKER, *Primary Examiner.*

D. H. TORRENCE, *Assistant Examiner.*

U.S. Cl. X.R.

260—247, 247.2